United States Patent [19]

Mancini et al.

[11] 4,298,137
[45] Nov. 3, 1981

[54] AUTOMATIC CONTAINER FEED FOR CONTAINER HANDLING DEVICE

[75] Inventors: Derek V. Mancini, Markham; William J. Wright, Orillia, both of Canada

[73] Assignee: Consumers Glass Company Limited, Etobicoke, Canada

[21] Appl. No.: 116,274

[22] Filed: Jan. 28, 1980

[51] Int. Cl.³ .............................................. B65G 59/06
[52] U.S. Cl. ...................................... 221/11; 221/176
[58] Field of Search ................. 221/11, 105, 104, 175, 221/176, 281, 106, 176, 178; 414/108, 109, 412, 416, 418, 411;

[56] References Cited

U.S. PATENT DOCUMENTS 1,906,126  4/1933  Mott ..................................... 414/414
3,367,534  2/1968  Carter ............................. 221/176 X Primary Examiner—Stanley H. Tollberg

[57] ABSTRACT

Apparatus and method for loading a stack of containers into a container chute are disclosed. The apparatus comprises a support adapted to support a row of stacked containers on their sides. The chute has a container side entrance. A guide is provided to guide the pushed movement of a stack of containers from the support through the container side entrance upwardly into the chute. The stack of containers is permitted to drop after insertion into the chute. The apparatus and method may be adapted to supply containers to a filling machine, such as coffee creamer or condiment filling machines.

62 Claims, 11 Drawing Figures

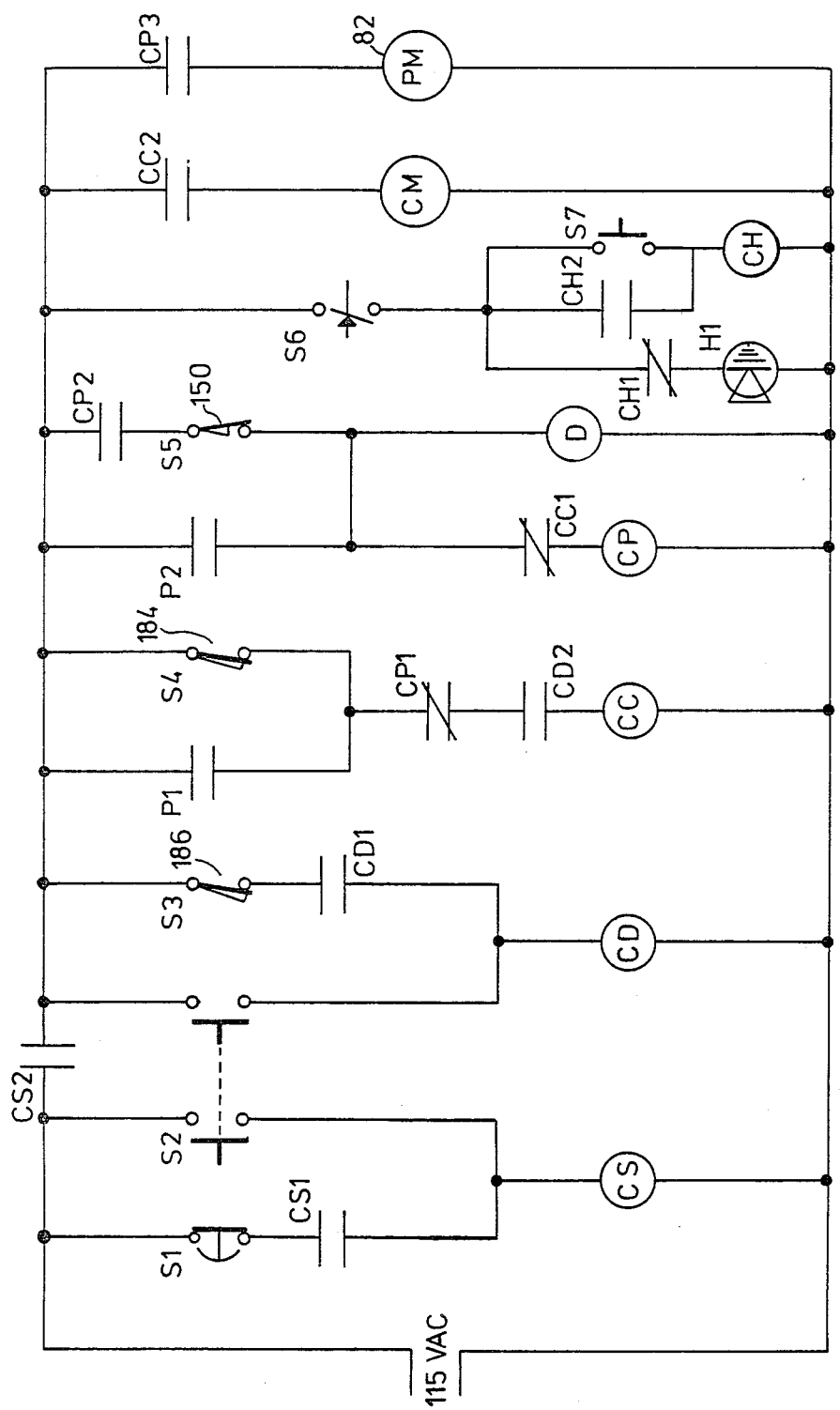

AUTOMATIC CONTAINER FEED FOR CONTAINER HANDLING DEVICE

FIELD OF THE INVENTION

This invention relates to apparatus and method for loading stacks of containers into chutes for holding such stacks.

BACKGROUND OF THE INVENTION

With the advent of high speed container filling machines, such as those used in filling coffee creamer containers, condiment containers, small serving dessert, fruit cups and yogurt containers, it has become very difficult for a machine operator to tend to all functions of the machine and, at the same time, maintain a sufficient number of containers in the filling machine's supply chutes. There is now available filling machines for filling coffee creamers which attain speeds of filling and sealing 1,000 containers per minute. In order to supply or maintain containers in supply chutes for machines of this nature, the operator would have to spend most of his time loading containers into the supply chutes.

It is common to obtain delivery of containers in bags where there may be several rows of stacked containers in each bag. In manually loading supply chutes for container filling machines, it has always been a problem in transferring the stacks of containers from the bags into the filling machine chutes and can often result in separation of the stacks and resultant loss of several containers by dropping them on the floor. With accidents of this nature, and in view of the demands in maintaining containers in the supply chutes, there is often the necessity of shutting down the filling machine until the container supply can be reinstated. Thus, high speed filling machines with manual loading of containers cannot conveniently operate at full capacity.

Another difficulty with existing filling machines is that the supply chutes are usually vertical. An approach to placing stacks of containers in the supply chutes is to drop the stacks of containers through the tops of the chutes to ensure a supply of containers. This limits the amount of containers in the chute, because of an operator's reach and is time consuming and can increase the possibility of accidents in placing stacks of containers into the supply chutes.

To avoid these problems, automation of the placement of the stacks of containers into the filling machine chutes would be advantageous. An approach to automating the supply of containers is disclosed in U.S. Pat. No. 4,077,180. Individual rows, one by one, are placed into hoppers provided on an upright conveyor system which conveys individual stacks of containers upwardly to an area which is aligned with tubes which lead to the filling machine chutes. The stacks of containers are pushed through the tubes downwardly into the chutes to provide a supply of containers.

With the requirement that the stacks of containers be loaded into the chute through the top, the overall height of the stack-loading mechanism becomes cumbersome. A complex arrangement is required to pick up individual rows of stacked containers and transport them to the upper level for loading into the chutes. At the upper level, the operator cannot observe the operation of pushing stacks of containers into the chutes, so that should one or more of the stacks jam in the hoppers or tubes which lead to the chutes, the problem can go unnoticed which may cause damage to the machine and block the supply of containers to the chute.

Since machines of this nature are used for packaging various types of foods, a semi-sterile condition is needed which is usually provided by housing the equipment in a chamber. Due to the top loading of containers into the chute with the machine described in U.S. Pat. No. 4,077,180, the housing to provide a sterile environment is quite large, complex and costly. In addition, maintenance of this type of machine is difficult because of the high levels to which the transport mechanism for the containers passes in positioning stacks of containers for loading into the tops of supply chutes for filling machines.

SUMMARY OF THE INVENTION

The apparatus and method, according to this invention, overcome a number of the above problems in providing a system for easy loading of stacks of containers into the supply chutes for filling machines. The apparatus, according to this invention, comprises means adapted to support a row of stacked containers on its side. The chute has a container side entrance spaced above the bottom of and below the top of the chute to define upper and lower chute portions. The upper chute portion is of a height to receive a row of stacked containers. Means guides the pushed movement of a stack of containers from the support means through the container side entrance. Means is provided for pushing a stack of containers along the support means and guide means upwardly into the chute upper portion and releasing contact with such stack located in said chute upper portion to permit such stack to drop past the entrance into the chute lower portion.

The method, according to this invention, for loading stacks of containers into a chute comprises supporting a stack of containers in a row on its side near the chute. The chute has a container side entrance spaced above the bottom of and below the top of the chute means to define upper and lower chute portions. A row of supported stacked containers is pushed towards the container entrance and such movement is guided through the entrance upwardly into the chute upper portion. Engagement with the stack is released to permit the stack to drop into the chute lower portion.

The apparatus and method may be adapted for placing containers in an essentially vertical chute, where the row of containers are laid out on a horizontal support at approximately waist level to facilitate the operator's positioning of the row of stacked containers on the support. The support may be moveable to and away from registration with the guide means for guiding the stack of containers through container chute entrance. The movement of the support to and from registration permits a positioning of the support away from the chute area at a more convenient location to facilitate positioning of stacks of containers on the support.

Locating the entrance to the chute along its side and spaced above the bottom of the chute, provides a reserve of containers beneath the container side entrance. Thus, a supply for the filling machine is maintained while loading of a new stack of containers in the chute. When the stack is dropped into the chute lower portion, the supply is replenished and maintained for the filling machine during its continuous operation.

The apparatus may also be controlled so as to sense when the supply of container stacks in the chutes is approaching a lower limit to actuate a device which pushes a supported stack of containers into the chute to replenish the supply. In combination with this, the support may be moveable so that, on removal of containers from the support, it is moved to another location for reloading of containers and either it or an additional set of already loaded stack of containers moves into alignment with the chutes preparatory to being pushed into the chutes upon demand for more containers.

The conveyor system for supporting the rows of containers, which have been stored in a bag, comprises a conveyor having a plurality of evenly spaced-apart parallel rods mounted on a carrier which moves the rods to and away from a container stack discharge area. The spacing between adjacent rods is such to support a stack of containers on its side. Container retaining means is provided along a side of the conveyor and which extends the length of a set of rods for receiving a predetermined number of rows of stacked containers in a bag. The retaining means defines an opening sufficiently large to permit a bag storing stacks of containers to pass therethrough and being less than the container width to be placed on the conveyor. The arrangement is such that the bag having a plurality of rows of stacked containers may be placed on the rods with rows of stacked containers placed between the rods. An open end of the bag is remote from the retaining means which retains the rows of containers between the rods as such bag is removed through the opening.

The apparatus, according to this invention, may be arranged so as to place the support for the stacked containers at waist level to facilitate positioning of rows of containers on the support and visual inspection of loading containers into the chutes. There is less chance of accidentally dropping stacks of containers and handling of the containers is reduced to minimize the chance of the operator contaminating any of the containers. The apparatus may be controlled to synchronize the various operations of the apparatus in assuring a constant supply of containers for a filling machine or other apparatus which requires a supply of containers.

The apparatus and method may be adapted to supply any number of rows of containers as would be required by the number of supply chutes for the machine, such as a coffee creamer filling machine or the like.

BRIEF DESCRIPTION OF THE DRAWINGS

Preferred embodiments of the apparatus, according to the invention, are shown in the drawings wherein:

FIG. 11 is a schematic of representative circuitry for controlling various functions of the apparatus.

DETAILED DESCRIPTION OF THE PREFERRED EMBODIMENTS

Figure 1:
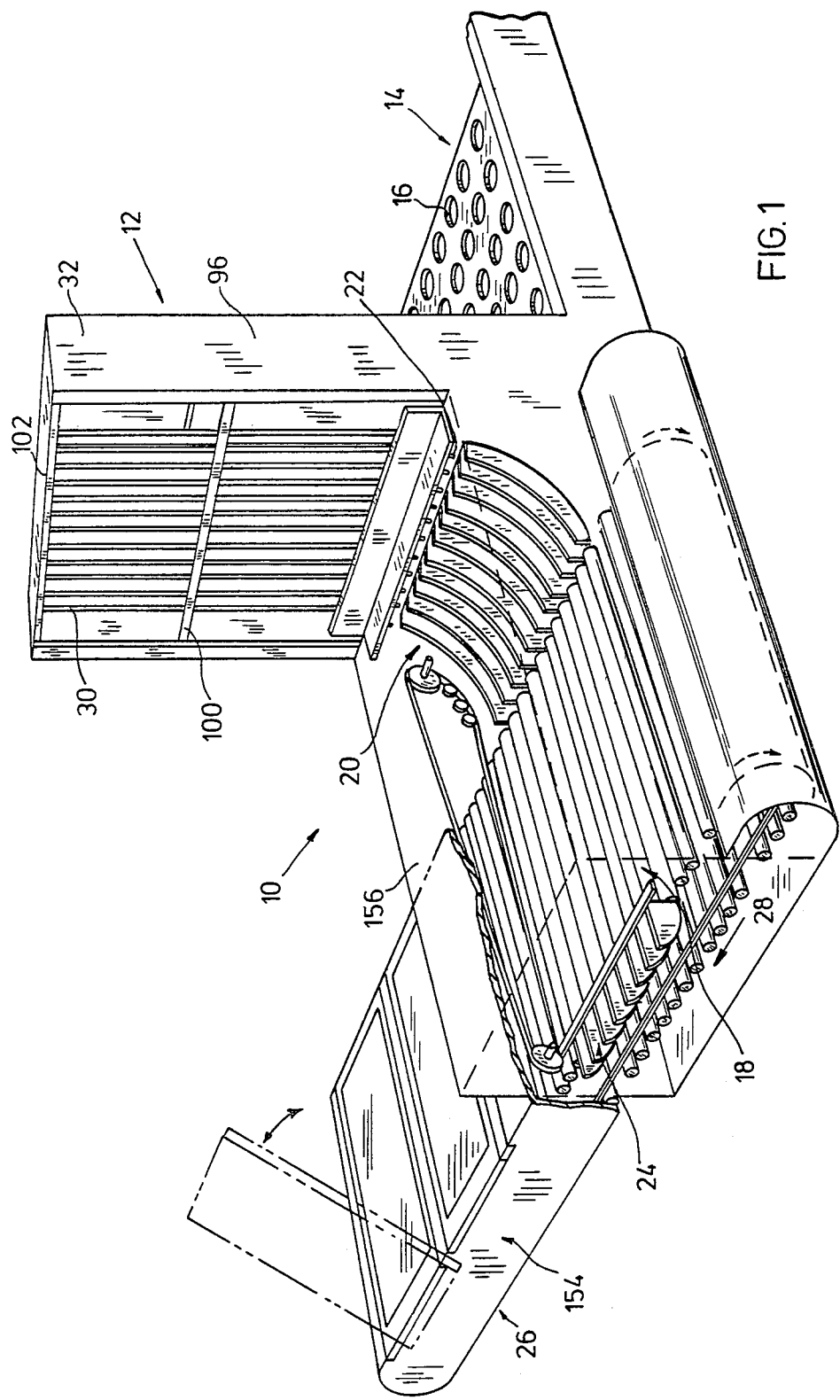
FIG. 1 is a perspective view of a preferred embodiment of the apparatus for loading stacks of containers into vertical chutes.
Figure 6:
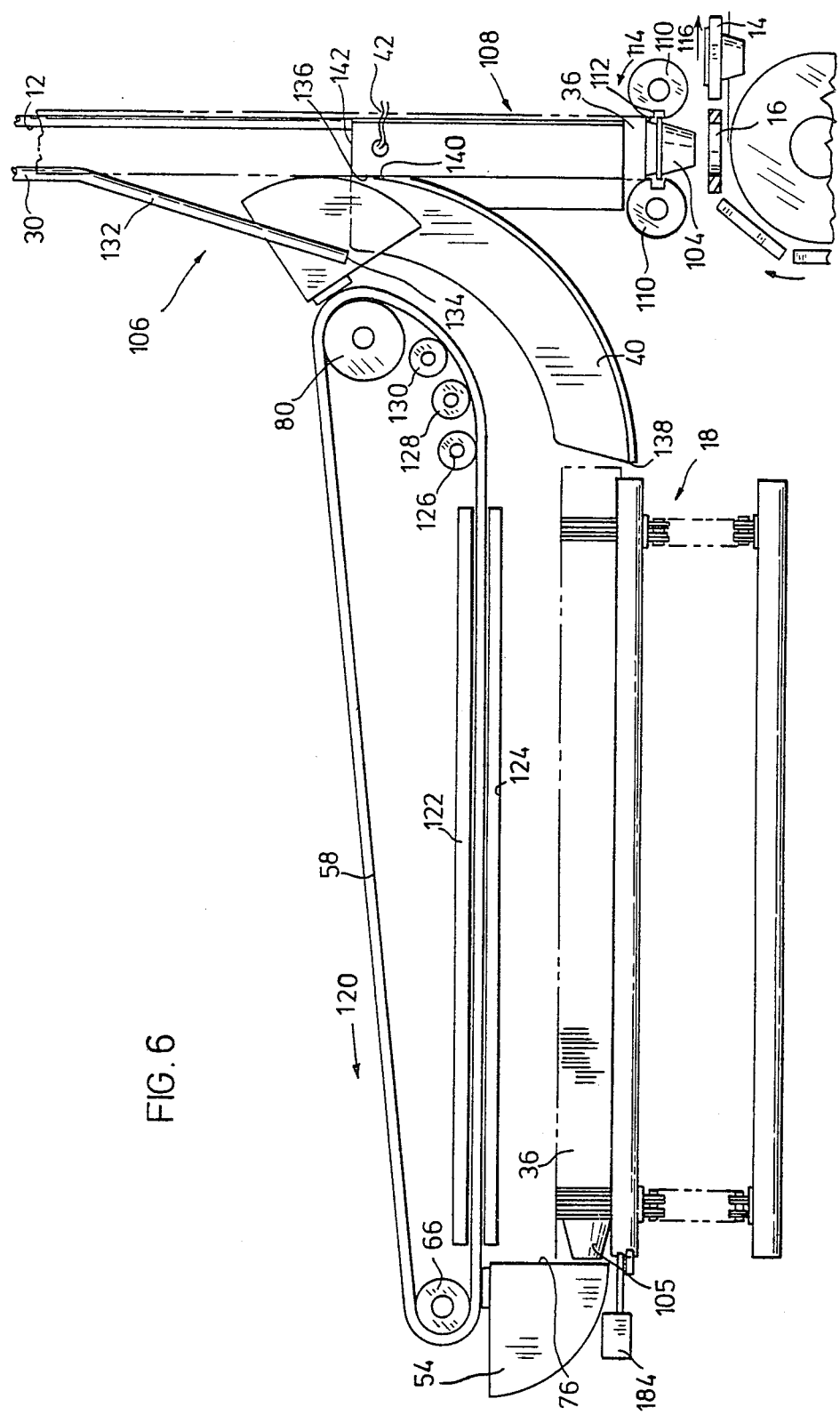
FIGS. 6, 7 and 8 are end views of the apparatus of FIG. 1 showing in sequence the pushing of the stack of containers up into container chutes.

The apparatus 10, as shown in FIG. 1 of the drawings, has been adapted for use with a container filling machine. A plurality of chutes 12 are disposed above a conveyor 14. A device 110, as shown in FIG. 6, is located at the base of the chutes 12 to dispense containers one at a time from the chutes and place them in the apertures 16 of the conveyor 14.

A support 18 is provided for supporting a plurality of rows of stacked containers on their sides. The containers are pushed, as guided by guide devices 20, up into the chutes 12 by entering through container side entrances 22 into the chutes 12. According to this embodiment, the means for pushing is a pusher device 24 which is provided to push the supported rows of stacked containers up into the chutes 12. Remote from the area where the containers are discharged from the conveyor, is a station generally designated 26 at which containers may be loaded onto the support in rows parallel to one another.

The conveyor 18 is moveable in the direction of arrow 28 to convey a set of rows of containers loaded onto said conveyor into registration with the guide devices 20. Thus, the rows of containers may be loaded at a convenient location 26 which is spaced from the discharge area. The operation of the pushing device 24 is controlled so as not to commence passing over the conveyor should the conveyor be moving, thereby avoiding any interference with conveyed stacks of containers.

The chutes 12, according to this embodiment, have an upper portion, as shown in FIG. 1, which is made up of a plurality of members in the form of rods 30, which are secured to the frame 32 so as to position four rods in a manner which defines the outline of the chute for confining a stack of containers therein. The rod portions for the upper chute portion 30 extend upwardly to the upper frame from container side entrance 22. As shown more clearly in FIG. 2, the rods 30 are located so that a pair of rods define mutual sides for two adjacent chutes in the manner shown.

In operation of the apparatus 10, the cover door 34 is opened to permit placement of a plurality of spaced-apart parallel rows of containers 36 on conveyor 18. Similarly, door 38 may be opened to place another set of containers on the conveyor bed 18. The conveyor bed 18 is moved to place the set of containers 36 in register with the guide devices 20. The guide devices 20 comprise a plurality of ramps 40 which are U-shaped in cross-section and curve upwardly from the conveyor bed to the container side entrances from the chutes 12.

According to this embodiment, ten rows of stacked containers are placed in the chutes 12 at the same time. Photoelectric sensor 42 has a beam of light directed onto it by light source 44. The sensor 42 is positioned, according to this embodiment, at a level in the chute beneath the side entrance opening. On sensing the light from source 44, it causes the pusher device 24 to be activated and push a set of rows of stacked containers upwardly into chutes 12 and then permit it to drop to the bottom of the chutes 12, should there be no containers in the chutes. A photoelectric sensor 46 is provided to detect the presence of sets of rows of stacked containers on the conveyor 18. After the set has been removed by the pusher 24, and sensor 46 no longer detects the presence of containers, the conveyor 18 is moved to position another set of rows of stacked containers in registration with the guide devices 20, where sensor 46 on detecting the first row in the set stops the conveyor in the registered position. Details of the operation of the electrical circuitry in controlling these aspects of the drives for the conveyors and pushers will be described in more detail with reference to FIG. 11.

Figure 2:
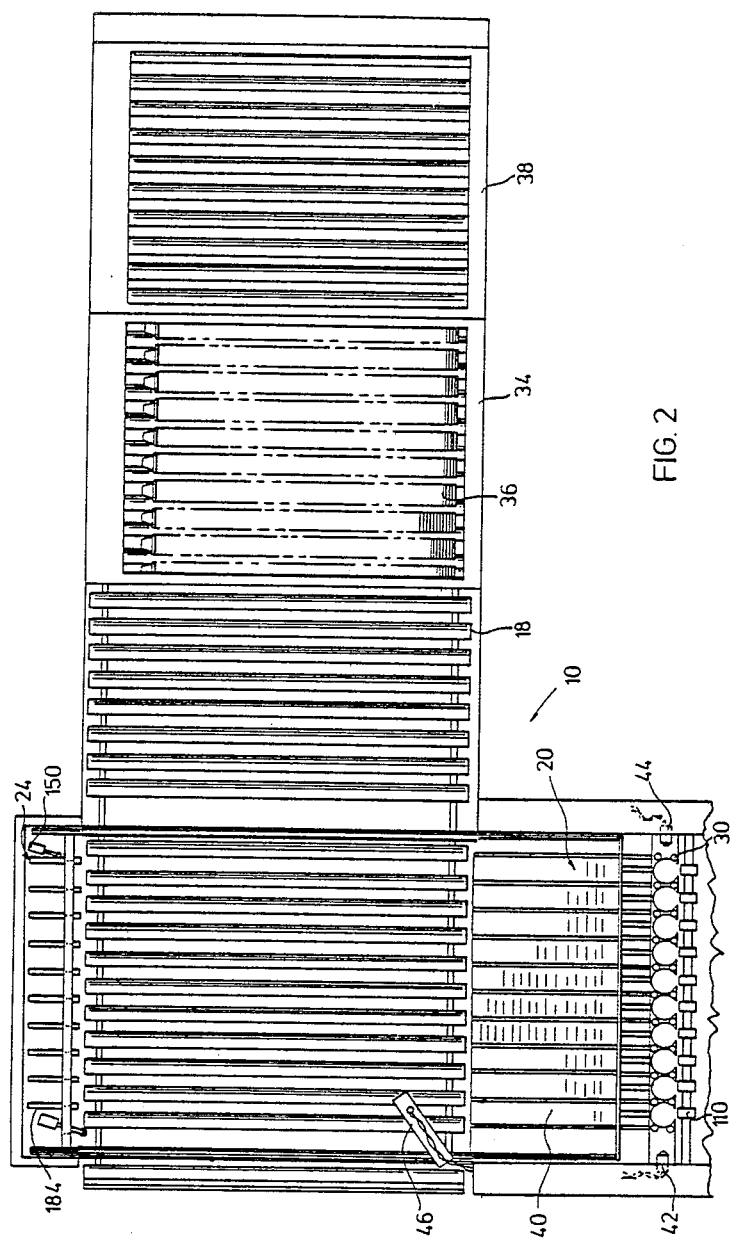
FIG. 2 is a top plan view of the apparatus of FIG. 1.

With the arrangement of FIG. 2, it is possible to provide four sets of stacks of containers 36 on the conveyor 18. It is appreciated, however, that depending upon the requirements of the system, the conveyor bed 18 may be extended to provide additional set-up areas for the rows of containers on the conveyor. It is also appreciated that the conveyor may be extended to provide sets of container stacks to a plurality of machines which are spaced along conveyor container discharge area.

Figure 3:
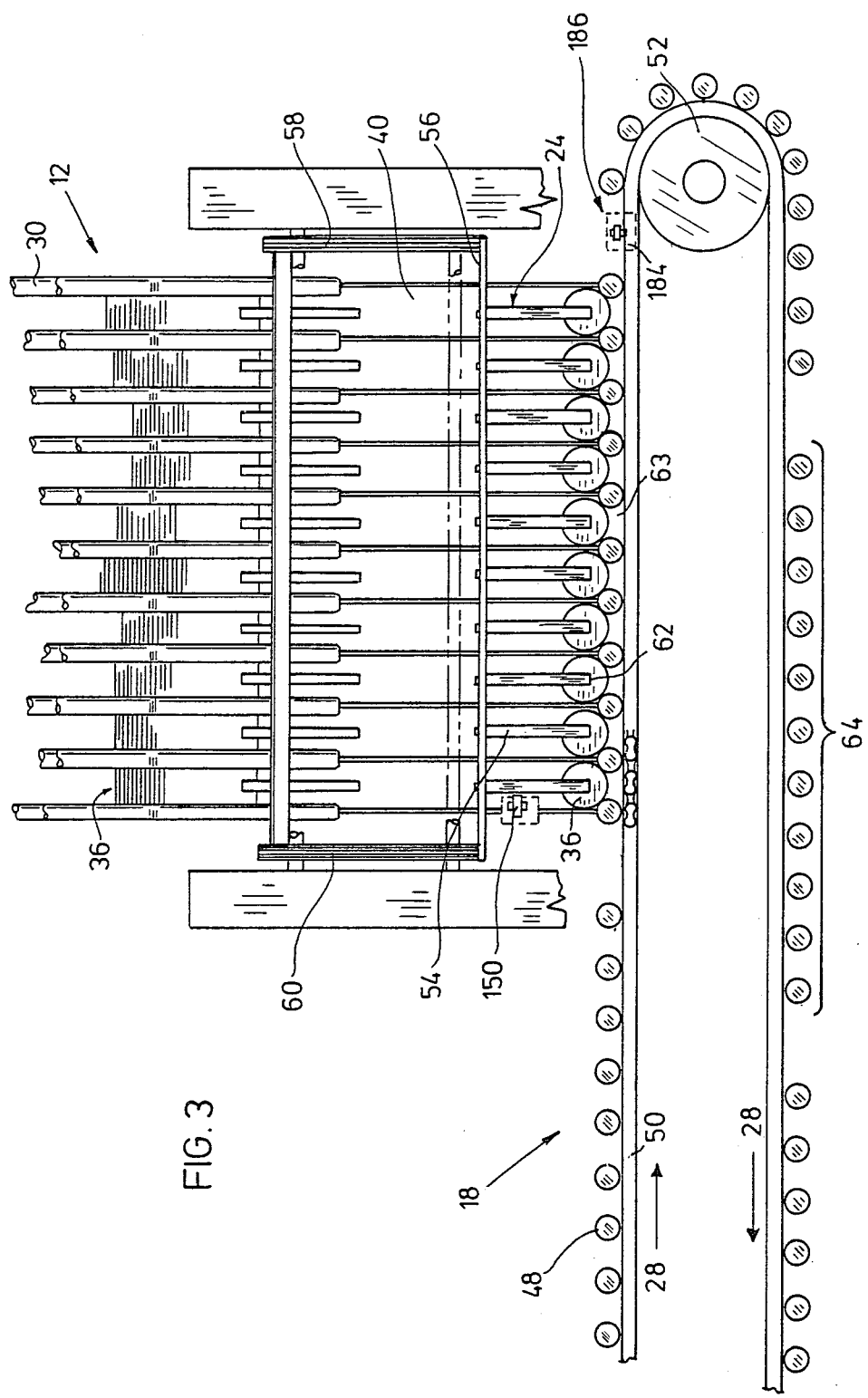
FIG. 3 is a side elevation of the apparatus of FIG. 1 showing the pusher device in position to push a plurality of rows of containers into the chute.

As shown in FIG. 3, according to a preferred embodiment, the conveyor bed 18 comprises a plurality of members in the form of rods 48 which are spaced apart and parallel to one another. The rods 48 are connected proximate each end to a carrier which, according to this embodiment, are closed chains 50. The spaced-apart chains 50 are trained about sprockets 52 which are positioned to define an essentially horizontal conveyor bed 18. Circular rods are used as the elongate members of the conveyor bed in this embodiment, since they readily support, due to a desired spacing therebetween, the stacks of round containers 36 on their sides. According to the positioning shown in FIG. 3, the containers 36, as supported by the rods 48, are in register with the ramps 40 for guiding the movement of the stacks of containers upwardly into the chutes 12, defined by the rods 30. In the chutes 12, there may be slightly varying levels of the container stacks 36, which is primarily due to a small difference in the number of containers in each row as they are placed in the chutes.

The pusher device 24 comprises a transport means on which a plurality of plates 54 are mounted. The transport means comprises closed chains 58 and 60 which are trained about sprockets to define the path of travel of the pusher means 24. A member 56 spans and is connected to the spaced-apart chains. According to this embodiment, the lower edges 62 of the pusher plates 54 contact the container stacks 36 at approximately their mid-portions, so that the lower edges of the plates clear the conveyor rods 48.

The spacing between the rods 48 is such to support the rows without the stacks falling between the rods; however, not to support them too high so that as the conveyor moves, the stacks remain in the respective spaces 63 between adjacent rods of the conveyor. According to this embodiment, the conveyor is always moved in the direction of arrow 28 to bring into register with the guide ramps 40 another set of rows of stacked containers to be pushed up into the chutes. The sets of rods as generally designated 64 are returned to the set-up station by travelling underneath the upper surface of the conveyor bed 18.

Figure 4:
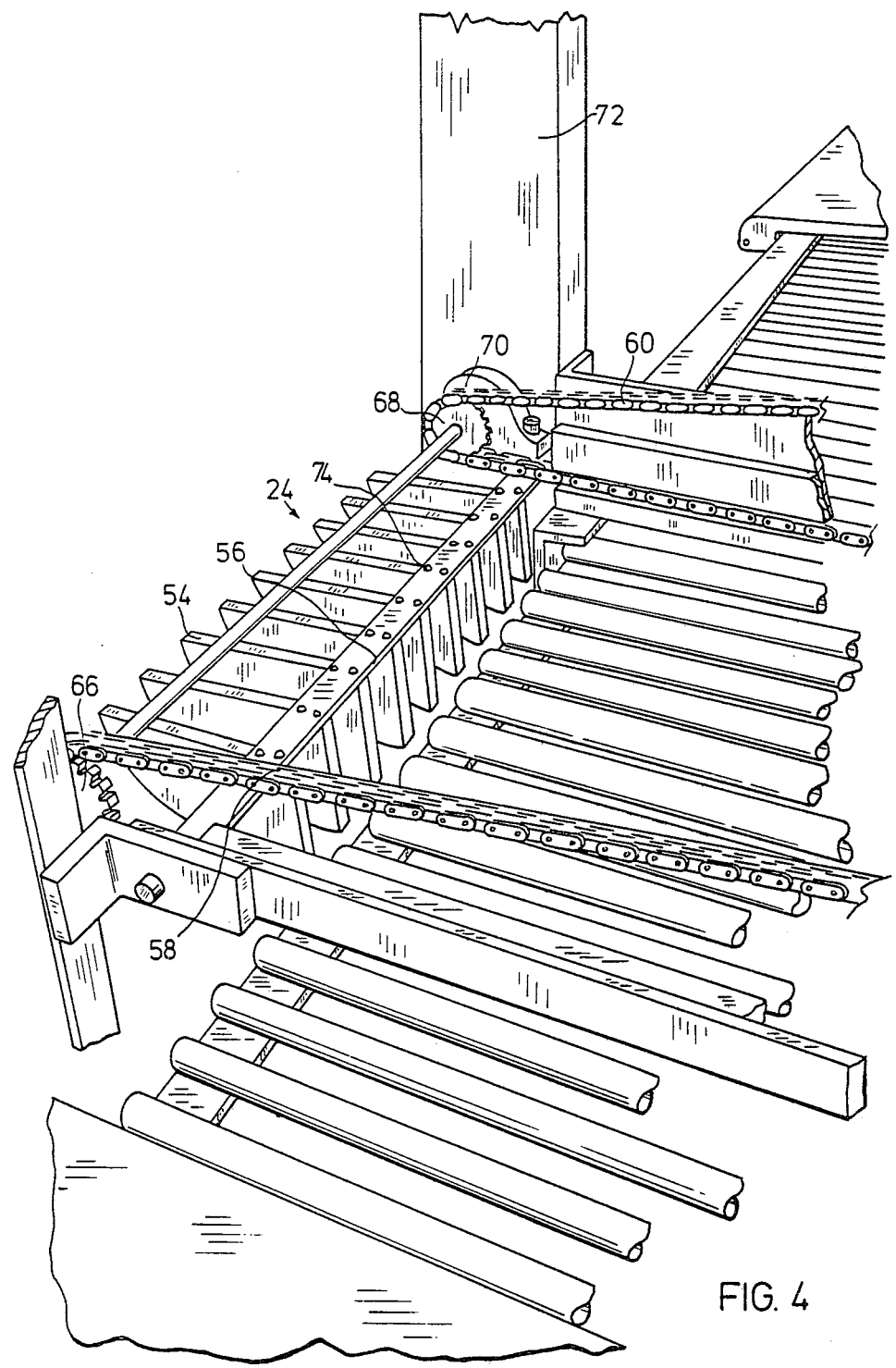
FIG. 4 is an isometric view of a portion of the drive for container stack pusher device.

Further details of the pusher assembly 24 are shown in FIG. 4, where the chains 58 and 60 are trained about sprockets 66 and 68 which are mounted in bearings 70, secured to support columns 72. The pusher plates 54 are secured to member 56 by screws 74. The member 56 is, in turn, connected to links of the chains 58 and 60. The positioning of the bearing 70 is such to locate the bottom portion 62 of the plate 54 at the level shown in FIG. 3 relative to the conveyor 18.

Figure 5:
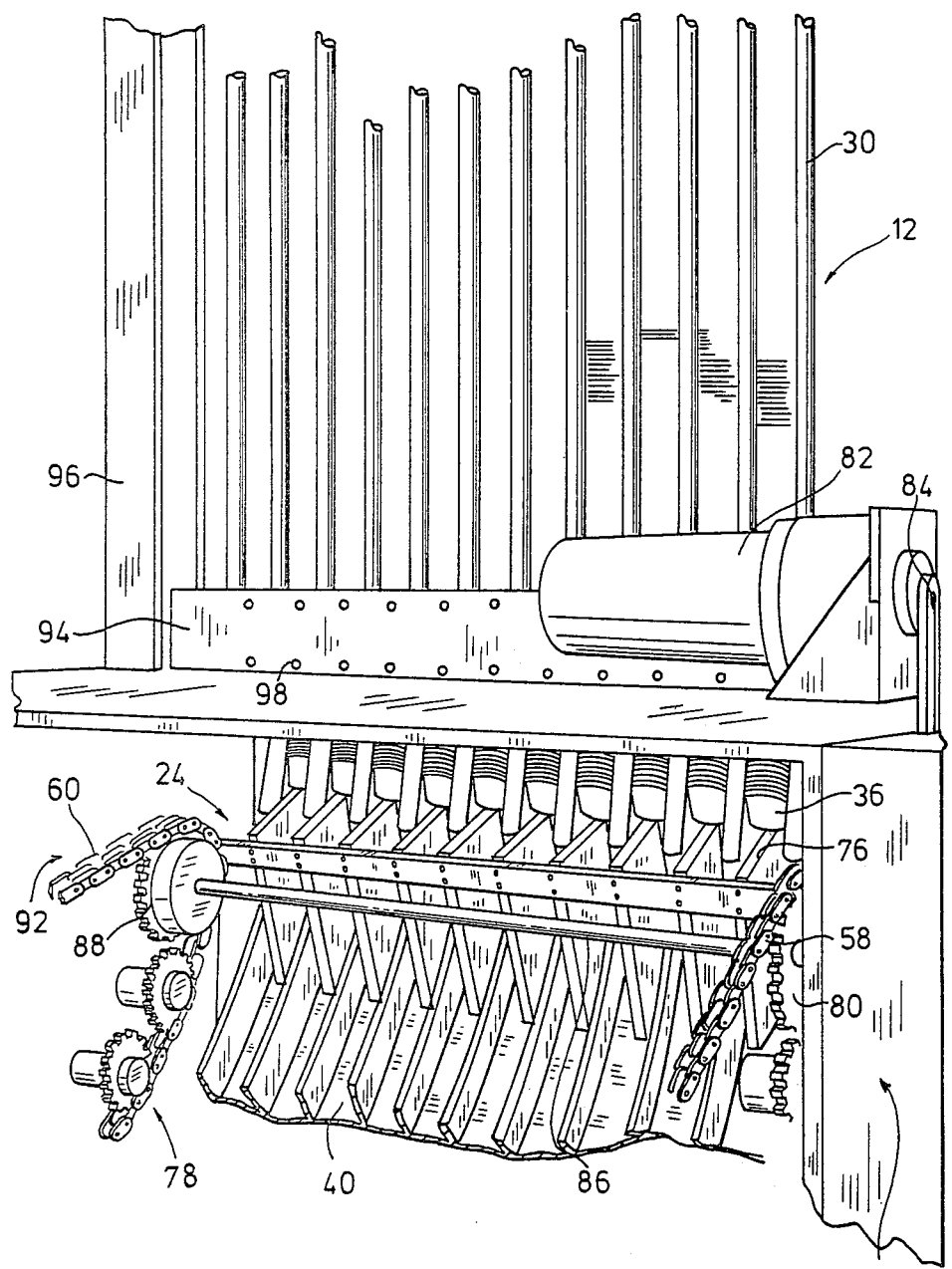
FIG. 5 shows the pusher device pushing stacks of containers up into the chutes.

As shown in FIG. 5, the pusher device 24 is pushing a plurality of stacks of containers 36 into the chutes 12, where the face portions 76 of the pusher plates 54 are about to disengage or move out of contact with the bottom containers of the stacks 36. In so doing, the stacks, as now located in the chutes, are free to drop and seek the level of containers which may remain in the respective chutes. A sprocket arrangement generally designated 78 is provided to define the path along which the pusher device 24 travels as it pushes the rows of containers up over curved ramps 40 into the chutes 12. The sprockets 80 and 88 of the transport means, as they engage chains 58 and 60, are driven by an electric motor 82 via chain 84 which engages a sprocket secured to shaft 86 and to which sprockets 80 and 99 are also secured. The sprockets 80 and 88 are supported by endframes 90 and 92 of the apparatus.

Further details of the mounting of the rods 30, which define the upper portions of the chutes, are shown in FIG. 5. L-shaped plate 94, which is secured to frame uprights 96, provides support for the lower end of the rods 30. Each rod is fastened to the upright portion of plate 94 by bolts 98. Also as shown in FIG. 1, additional support for the rods is provided by cross-bars 100 which are secured to the rods and the rods may be additionally secured to top plate 102 of the frame for the chutes 12.

Turning to FIG. 6, further details of the apparatus for pushing a stack of containers 36 into chute 12 is shown. Considering for the moment a single stack 36, aligned or registered with a ramp 40, a single pusher plate 54 is in position adjacent the bottom container 104 in readiness to contact same and commence pushing of the stack 36 toward the ramp 40. The conveyor 18 is horizontally disposed and upon the photoelectric detector 42 detecting a low level of containers in the chute lower portion 109, the pusher 54 is actuated. The chute 12, as more clearly shown in FIG. 6, has the upper portion above the container side entrance generally designated 106 and a lower tube portion generally designated 108 beneath the container side entrance. In this embodiment, the stack of containers 36 is held in the chute 12 by dispensing wheels 110, having notches 112, such that when rotated in the direction of arrow 114 removes a single container 104 at a time from the stack and places it in the appropriate aperture 16 of the filling conveyor 14 moving in the direction of arrow 116.

Thus, the lower portion 108 of the chute 12 provides a reserve of stacked containers such that the filling conveyor 14 and dispenser 110 may continue to operate to place containers in the conveyor, while a fresh supply of stacked containers is being placed in the chute 12. Upon sensor 42 causing actuation of the drive motor 82, the closed chains 58, 60 are moved in the direction of arrow 120. This causes face portion 76 of pusher plate 54 to contact container 105 and push the stack 36 towards the curved ramp 40. Because the containers are stacked and, in this instance, are fairly shallow, the ramp 40 may have a relatively small radius of curvature for transferring the containers from the horizontal plane of the conveyor into the vertical plane of the chute 12. Since the containers are being pushed upwardly, the ordered stacked arrangement of the containers is maintained as they are moved upwardly into chute 12. To ensure proper tracking of the pusher plate 54, guide bars 122 and 124 are provided to guide the chains across the span between sprocket 66 and idler sprockets 126, 128 and 130. The purpose of the idler sprockets 126, 128 and 130 is to define a curved portion in the path of the pusher 54, such that it traverses the arc of the smoothly curved ramp 40.

The side container entrance 106 for the chute 12 is provided, in this embodiment, by bars 30 sloping outwardly and downwardly to define correspondingly outwardly and downwardly sloping legs 132. The distal end 134 of each bar is spaced from the upper edge 136 of chute lower portion 108 a distance at least equal to the anticipated diameter of the containers 104 to permit them to pass freely up into the chute 12. The lower edge 138 of the curved ramp 40 is at a level to smoothly receive the pushed stack 36. The upper edge 140 of the ramp is positioned adjacent the upper part 142 of the chute lower portion 108 to provide a smooth transition of the stack up into chute 12. Thus, the upper edge 140 of ramp 40 is positioned beneath the outer downwardly sloping legs 132 of the bars 30 to direct the upwardly moving stack 36 into the chute 12.

Figure 7:
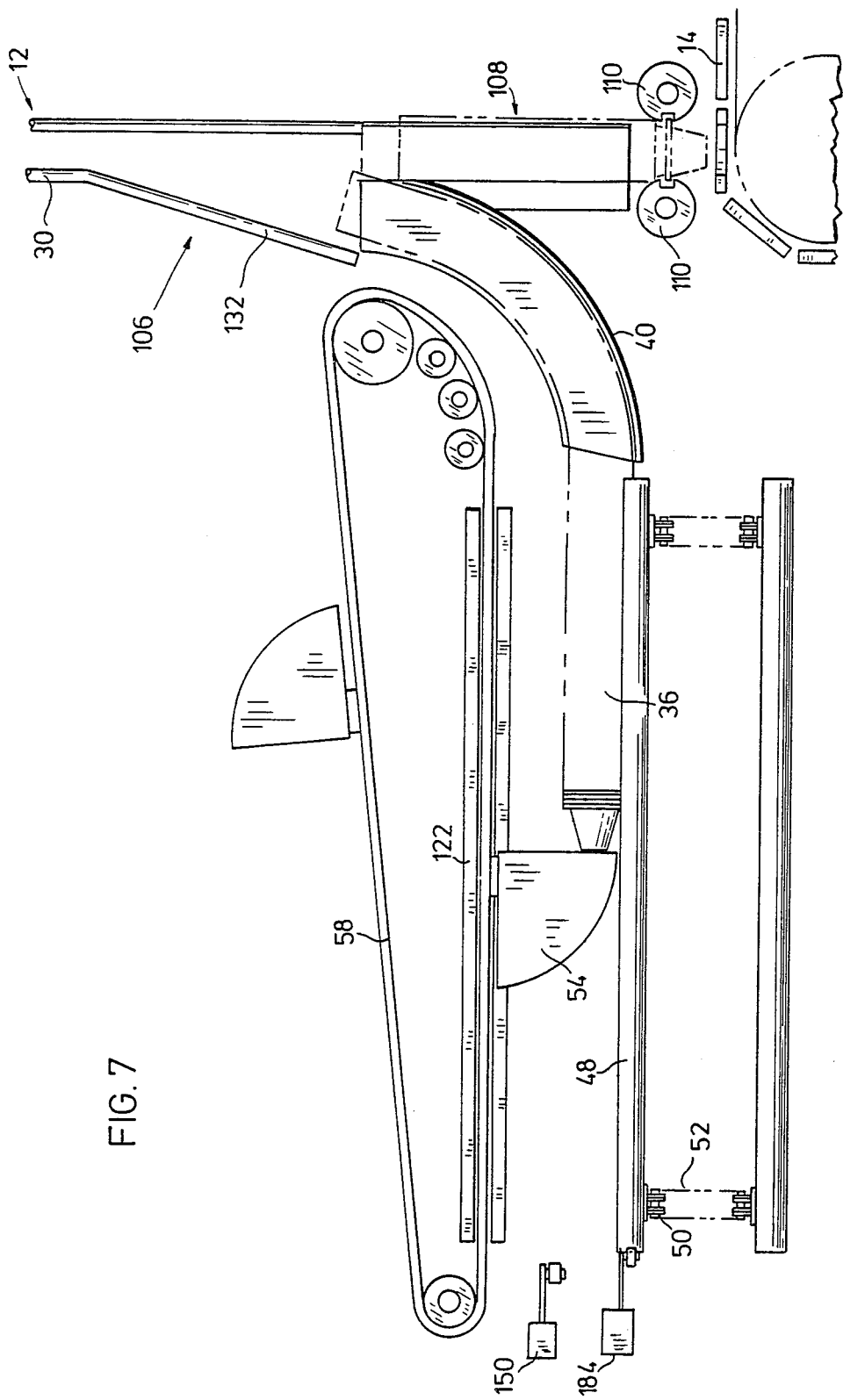

As shown in FIG. 7, the movement of the pusher plate 54 has caused the stack 36 to curve upwardly along ramp 40 and commence its entry into the container side entrance 106 beneath legs 132 of the chute bars 30. In the meantime, the stack of containers in the lower chute portion 108 is being dispensed by the dispenser wheel 110 with continued movement of the filler conveyor 14.

Figure 8:
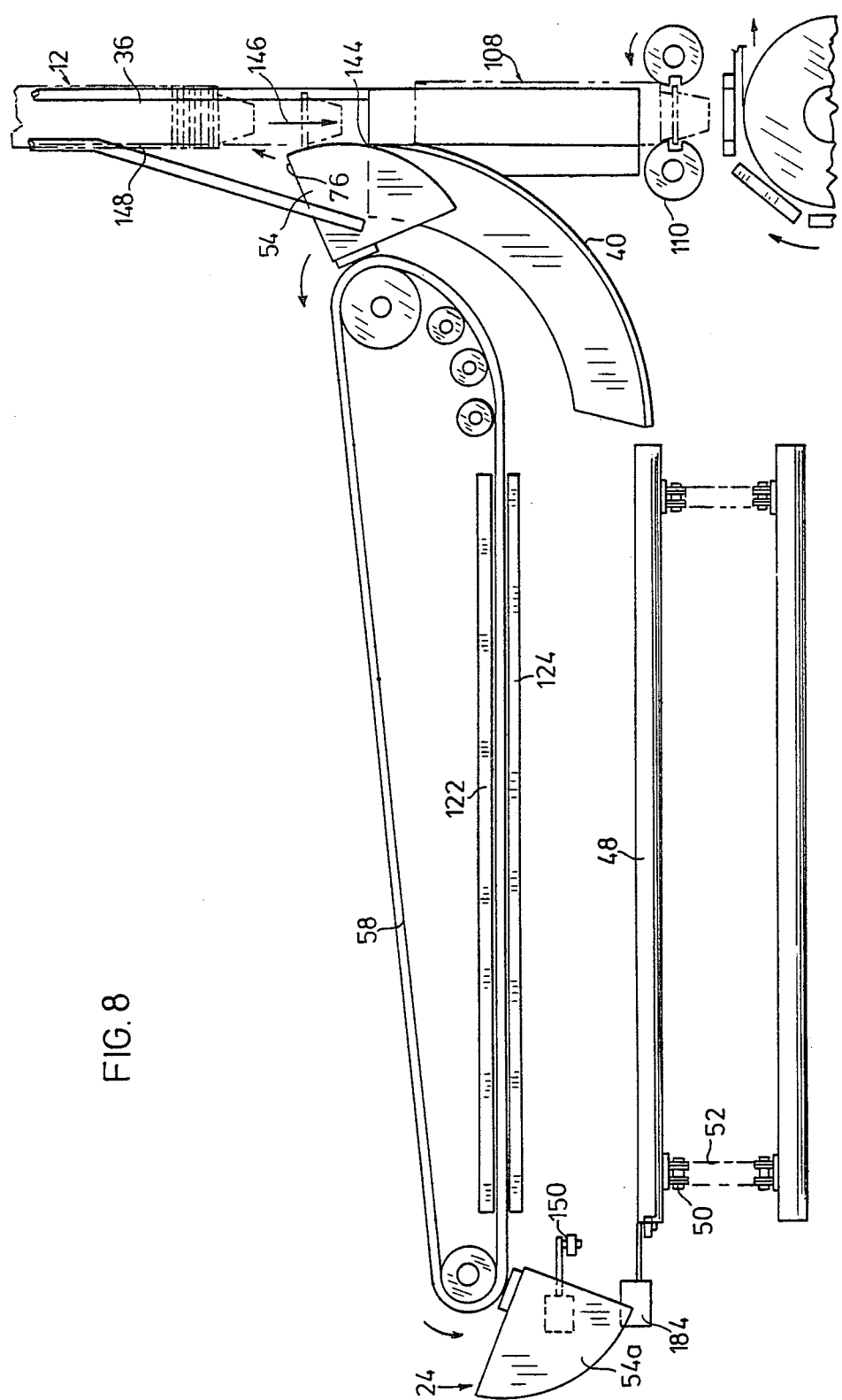

With the continued movement of the pusher drive motor 82, the pusher plate is moved by the side entrance to a position, as shown in FIG. 8. At this point, the face portion 76 of the pusher plate has disengaged the stack of containers 36. The arcuate surface 144 of the pusher plate 54 serves to deflect the stack 36 as it drops into the lower portion of the chute 108 in the direction of arrow 146. It can be seen that the arcuate surface 144 is tangential with the imaginary boundary line 148 of the chute 12 to confine the stack to move downwardly into lower portion 108 of the chute. This prevents containers flopping or falling out onto or catching on ramp 40. The arcuate surface 144 is also shaped to avoid the trailing portion of the pusher plate 54 interferring with the curved surface of ramp 40 as the plate moves along this area in pushing the stack 36 up into chute 12.

Movement of the pusher mechanism 24 is continued until the position for the pusher is at that shown in FIG. 6, where pusher plate 54a is approaching that of pusher 54 in FIG. 6. To sense this position, a micro-switch 150 is located to be tripped when the plate 54a is at the position shown in FIG. 6 to cause a signal which deactuates the drive motor 82 to stop movement of the closed chains 58 and 60. At this position, the arcuate surface 144 of the pusher 54 remains adjacent the chute edge 148 to ensure a continued smooth transfer of the stack 36 down the chute 12 into the lower portion 108.

According to this embodiment, the pusher plates 54 are of a thickness which readily pass between the spaced-apart leg portions 32 of the bars 30. As a result, the pusher plate in a simple manner moves the stack of containers up into the chute and simply disengages therefrom by continued movement through the container side entrance area. At the same time, the depending legs 132 of the chute entrance serve to guide continued upward movement of the stack of containers into the chute 12.

Figure 9:
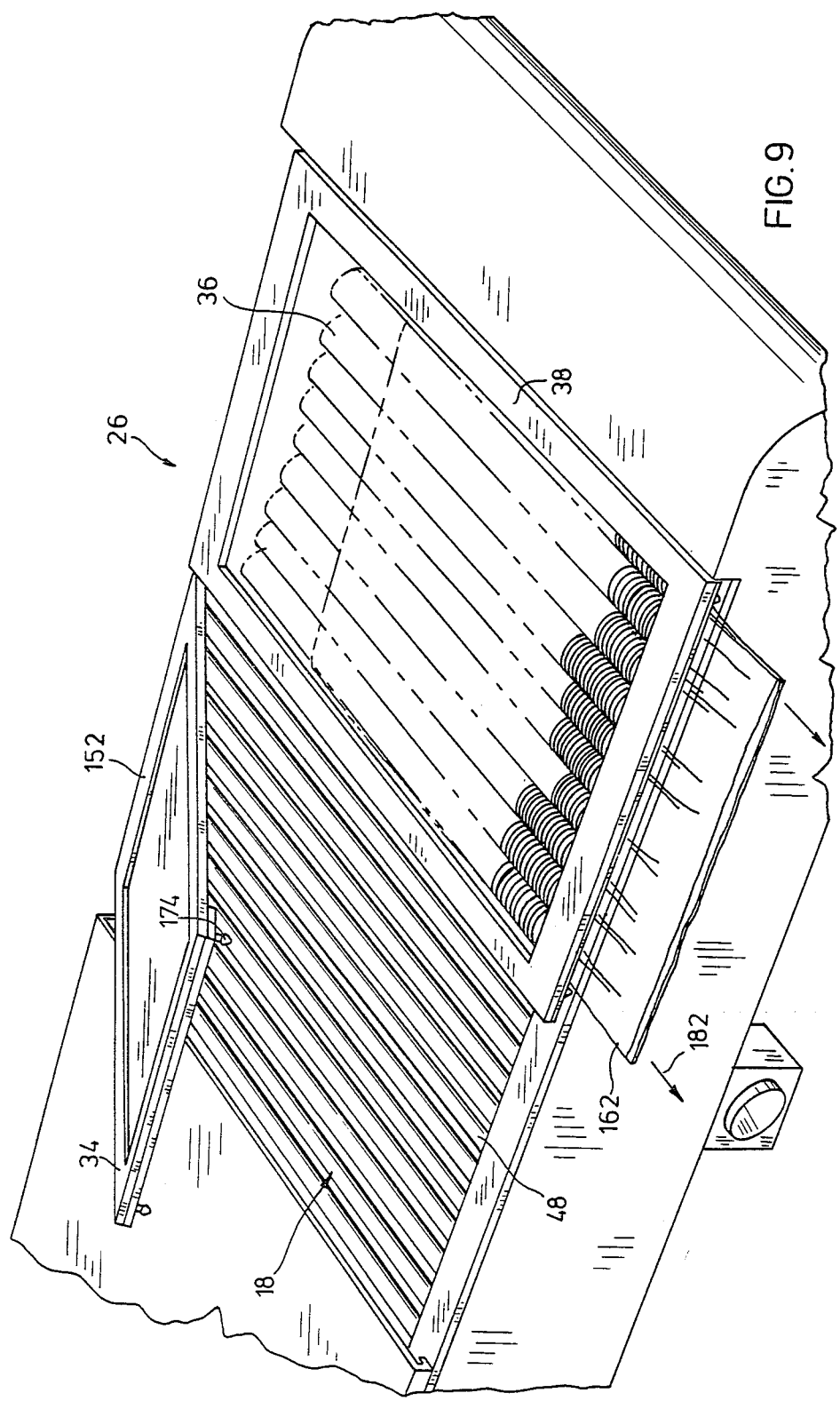
FIG. 9 shows in more detail a portion of the apparatus of FIG. 1 at which stacks of containers are laid on the conveyor.
Figure 10:
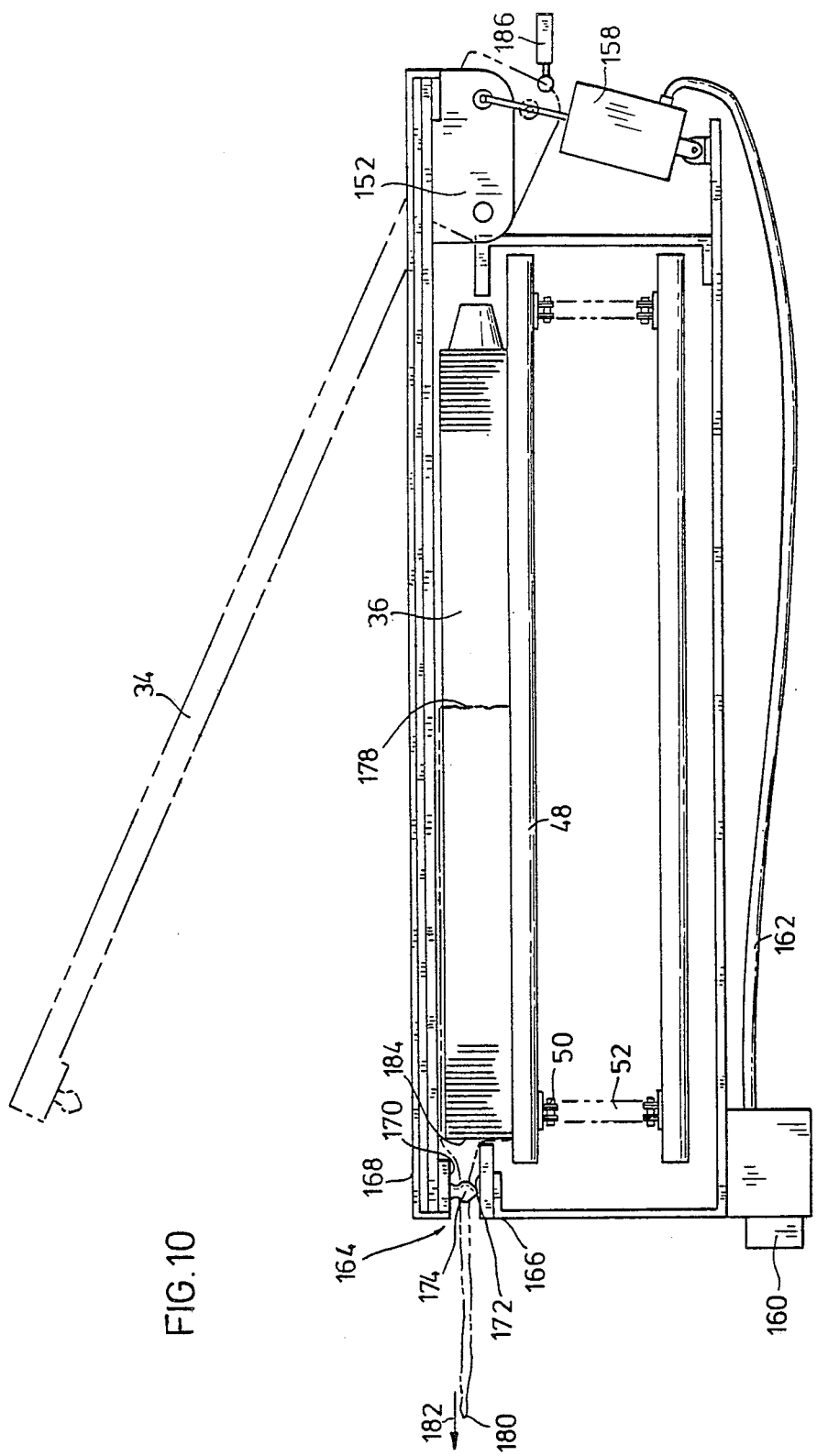
FIG. 10 is a section through FIG. 9 showing the relationship of door to housing for container stack conveyor system.

A housing is provided for the conveyor area and container discharge area as designated 154 and 156 in FIG. 1. Access to the conveyor bed is provided through the doors 34 and 38 to permit loading of stacks of containers onto the conveyor bed 18 at the remote location. An advantage of this apparatus is pushing containers from a horizontal plane up into the vertical chutes permits positioning of the conveyor bed 18 at waist level for the operator. Referring to FIGS. 9 and 10, door 34 is opened as it is hinged along side 152 to frame 154. The door 34, as shown in FIG. 10, is held opened by actuating an air cylinder 158. The button or control member for air cylinder 158 is provided at 160 and controls the air pressure through the line 162 to air cylinder 158. With the door 34 held in the open position, a bag of stacked containers may be placed on the conveyor bed 18.

As shown in FIG. 9, the bag 162 has ten rows of stacked containers 36 held therein. The bag with containers is placed on the conveyor rods 48. By moving the rows about on the rods, the rows seek their spaced-apart parallel aligned position, where there is sufficient fullness in the bag sides to drop into the areas between the bars. Each row is nestled in the space between each adjacent set of rods 48. The door, in this instance 38, is closed where, as shown in FIG. 10, a device 164 for holding or retaining the stacks on the conveyor is provided as defined between the housing portion 166 and the door free end 168. In this particular embodiment, the lower edge 170 of the door and the upper edge 172 of the housing define the upper and lower edges of the opening through which the bag is withdrawn. Due to the weight of the door, a pair of feet 172 are provided at the door free edge to space edges 170 and 172 apart to define the stack retaining device 164. With the open end of the bag 178 located remotely of stack retainer 164, the closed end 180 of the bag 178 is withdrawn through the opening in the direction of arrow 182. The inner edge 172 of the housing stops the containers from moving outwardly through the opening which is appreciably smaller than the diameter of the containers, yet sufficiently large to allow the bag 162 to be pulled out from the conveyor bed area in the direction of arrow 182. In so doing, the stacks of containers have a tendency to ride up stop 172; however, the underside of the door confines such movement to retain the stacks on the conveyor and in position between the bars.

Due to the frictional engagement between the stack of containers 36 and the bag 162, all stacks are pulled towards the edge 172 in the manner shown in FIG. 10 to provide an alignment of stack upper edges 184 in the manner shown. With the bag totally removed from the conveyor bed area, all ten stacks of containers 36 are aligned and properly rest on the spaced-apart bars 48 in readiness for movement to the container discharge area beneath the housing 156.

Although this embodiment of the invention is designed to handle stacks of round containers, which may be of the coffee creamer type or single serving yogurt type, it is possible that other stacks of containers may be handled such as square or rectangular containers. Thus, different shapes for the conveyor rods may be needed dependent upon the shape of containers to be laid on the conveyor. These elongate rods may be T-shaped for example, should it be desired to handle square forms of containers with the ramps 40 as the guide means formed accordingly and with corresponding change in the chute confinement bars 30 to properly receive and confine such form of containers.

As shown in FIG. 6, a level of container stacks in the chute 12 is provided in chute lower portions 108. A photoelectric cell 42 emits a signal when the level of the stacks drops below the level of the photo cell in the chute lower portions 108. The number of containers remaining in the lower portion of the chute 108, when the photo cell actuates the pusher drive motor, is predetermined to be sufficient to enable continued operation of the filling conveyor 14 while a new supply of stacks of containers are loaded into the chute and dropped in the lower portion 108.

Various approaches may be taken in controlling the drive motors for the conveyor supporting the stacks of containers and the motor for moving the pusher plates or paddles 54. As part of the electrical circuit components, photo cell 42 senses a level of containers in the chute, while photo cell 46, as shown in FIG. 2, senses the presence of stacked containers on the conveyor. In determining the position of the paddles or pushers, micro-switch 150 is contacted to stop pusher movement at the position shown in FIG. 6. As to conveyor movement and for the particular set-up for the electrical control of the conveyor, a micro-switch 184 is contacted intermittently by the bars of the conveyor. This micro-switch works in conjunction with the photoelectric cell 46 in a manner to be discussed in determining conveyor movement. In addition, a safety micro-switch 186 is located on each door which is actuated when the door is opened to prevent conveyor movement and thus avoid injury to the operator when loading stacks of containers onto the conveyor.

Referring to FIG. 11, standard notation is used for identifying the various components of the control circuitry. For purposes of description, micro-switch S3 is switch 186 on the door, as shown in FIG. 10. Micro-switch S4 is the micro-switch 184 on the conveyor, as shown in FIG. 2. Micro-switch S5 is switch 150 which senses pusher location, as shown in FIGS. 2 and 6. Photocell 42 in the chute is P2 and photocell 46 on the conveyor is P1. The conveyor motor, not shown in the previous drawings, is designated CM and the pusher motor 82, as shown in FIG. 5, is designated PM. The control circuitry functions as follows.

The control circuitry, the conveyor motor CM and pusher motor PM are powered by 115 volts alternating current. Power is supplied to the control circuitry by momentarily closing the reset switch S2, thereby causing the contactor coil CS to be energized. This closes contacts CS1 and CS2. After the reset switch S2 is opened, the contactor coil is kept energized by current flowing through the emergency stop switch S1, which is normally closed, and contact CS1. If the emergency stop switch S1 is momentarily opened, contactor coil CS is de-energized and contacts CS1 and CS2 are opened.

Momentarily closing the reset switch S2 also causes contactor coil CD to be energized and it is kept energized by current flowing through the safety switch S3 for the door which is closed when the door is opened. If the door is opened, this opens switch S3, thus contactor coil CD is de-energized, thereby opening contacts CD1 and CD2 which prevents the conveyor motor CM from running. When the door is closed, contactor coil CD is re-energized by momentarily closing reset switch S2.

Photoelectric cell P1 is closed if its light beam is unobstructed. Micro-switch S4, which is open when the conveyor motor is off, is closed by pressure on its arm, caused by a rod of the conveyor striking the arm. Contact CP1, which is open when the pusher motor is running, prevents the conveyor motor from running when the pusher motor is on. Contact CD2 is closed if the door is closed and the reset switch has been momentarily closed. The absence of containers in row one of the conveyor causes photoelectric switch P1 to close and if contacts CP1 and CD2 are closed, the contactor coil CC is energized, thereby closing contact CC2 which starts the conveyor motor CM running. The bars on the conveyor will obstruct the light flow on photoelectric switch P1, but during this time, micro-switch S4 is closed, thereby maintaining the energization of contactor coil CC. Finally, when new containers of the first row on the conveyor obstruct the light flow of photoelectric switch P1 and micro-switch S4 is open, due to arm being located in the space between the bars, as shown at 186 in FIG. 3, contactor coil CC is de-energized, thereby stopping the conveyor motor CM.

Photoelectric switch P2 is closed when the containers in the chutes reach a low level and the light pass is unobstructed. If conveyor motor CM is not running, contact CC1 will be closed and the contactor coil CP will be energized, thereby closing contact CP2 and contact CP3 which starts the pusher motor PM running. After the new containers are deposited in the chute 12, photoelectric switch P2 will open, but contactor coil CP is kept energized by current flowing through the closed contact CP2 and micro-switch S5 is normally closed. When the opposite pusher plate 54a of FIG. 8 open micro-switch S5, the contactor coil CP is de-energized, thereby opening contact CP2 and CP3 which stops the pusher motor CM.

In the event that no new containers were deposited in the chute, photoelectric switch P2 will stay closed and the contactor coil CP will not be de-energized by the opening of micro-switch S5. The timer mechanism D will sense the increased time that contactor coil CP is energized, and will close switch S6. The closing of switch S6 will cause the horn H1 to sound and will alert the operator that no new containers were deposited in the chute. If the operator momentarily closes switch S7, contactor coil CH will be energized, thereby closing conctact CH2 which silences the alarm. The operator will then hit the emergency stop switch S1, refill the conveyor, and then restart the cycle by momentarily depressing the reset switch S2.

With this control circuitry, an operator is able to load onto the conveyor at least two sets of rows of containers and then leave the machine unattended until the last set moves within the covered housing area for the conveyor. During that time, the operator is free to attend to other functions about the machine. Assuming that the filling machine is operating at a capacity of 1,000 containers per minute, it may be possible for the operator, having two loading stations, to load onto the conveyor a total of 3,500 containers per set, which is 7,000 containers in total. Thus, the operator has something less than seven minutes which he can spend on other functions of the machine without attending to reloading additional containers onto the conveyor. Should a set of containers be missed in reloading the conveyor, as is apparent from the description of the circuitry, the conveyor will continue to move until the first row of the next set is sensed by the photoelectric cell P1 which then stops the conveyor motor. Adjustment of the photoelectric sensor position 46 is permitted so that the conveyor motor is stopped at the point which registers the rows of containers with the ramps 40. In view of the time delay for pushed stacks of containers to ride up the ramps into the chutes after the lower predetermined level of container stacks beneath container side entrance has been sensed, it is appreciated that the sensed lower level may also be above the side entrance. The extent of the sensed lower container level above the side entrance would be selected, such that the stack levels in the chutes would be below the side entrances as the pushed new stacks of containers began entering the chutes.

The housing 154 for the container discharge station and conveyor may be in communication with another housing, not shown, which would encase the filling station over conveyor 14. A supply of air may be forced into the filling station housing and with the chute area enclosed and the bottom area of the conveyor closed, a positive pressure of air may be developed in the housing for the conveyor and container discharge area and in the chutes to ensure that outside air does not enter the housing to contaminate the containers which are about to be filled. In addition, this form of loading reduces contact of operator with the containers, since the containers remain in the bag when loaded onto the conveyor. Thus, the operator never needs to touch the containers.

Although the preferred embodiment of the invention has been described with respect to supplying creamer containers to a creamer filling machine, it is appreciated that the container loading machine may be put to other uses in supplying or placing stacks of containers in chutes. It is appreciated that the support area for the container stacks may not always be horizontal; however, it must should support the stacks on their sides and further the chute for receiving the containers may not always be absolutely vertical, but may be slanted. An instance where it may be desirable to slant the conveyor downwardly away from horizontal is to reduce the curvature of the guide ramp and, thus, reduce the extent of the curve induced in the stacks as they are pushed upwardly into the chutes. It is appreciated that with a conveyor slanted in this manner, the retaining means would be located along the lower side of the conveyor to permit withdrawal of the bag away from the containers with consequent location of the stacks on the conveyor bed.

Although various embodiments of the invention have been been described herein in detail, it will be understood by those skilled in the art that variations may be made thereto without departing from the spirit of the invention or the scope of the appended claims.

We claim:

1. An apparatus for loading a stack of containers into a container chute comprising means for supporting a row of stacked containers on its side, said chute having a container side entrance spaced above the bottom of and below the top of said chute to define upper and lower chute portions, said upper chute portion being of a height to receive a row of stacked containers, means for guiding pushed movement of a stack of containers from said support means through said container side entrance, means for pushing a stack of containers along said support means and guide means upwardly into said chute upper portion and releasing contact with such stack located in said chute upper portion to permit such stack to drop past said entrance into said chute lower portion.

2. An apparatus of claim 1, wherein said support means, as it supports a stack of containers, is moveable into and out of alignment with said guide means.

3. An apparatus of claim 1, wherein said chute is upright.

4. An apparatus of claim 3, wherein said support means is essentially horizontal, said guide means is curved to direct the pushed movement of a stack of containers into said chute upper portion.

5. An apparatus of claim 4, wherein said guide means is a curved ramp leading from said support means upwardly to said container side entrance of said chute.

6. An apparatus of claim 5, wherein said ramp is U-shaped in cross-section.

7. An apparatus of claim 5, wherein said pusher means is located above and adapted to travel along said support means and follow the upward curvature of said ramp, and move past said side entrance of said chute to thereby release contact with such stack of containers to permit it to drop.

8. An apparatus of claim 7, wherein said pusher means is driven by a drive which, when actuated, drives said pusher means as it contacts the bottom of a stack of containers to move such stack into said chute.

9. An apparatus of claim 8, wherein said pusher means has a face portion which contacts the bottom of a stack of containers, said drive means as it moves said face portion of the pusher means by said side entrance disengages said face portion from stack bottom to permit such stack of containers to drop.

10. An apparatus of claim 5, wherein the upper portion of said chute above said lower portion is defined by a plurality of upwardly extending spaced-apart bars adapted to confine a stack of containers, a pair of spaced-apart bars extending downwardly and outwardly away from said chute to define said side entrance into said chute.

11. An apparatus of claim 10, wherein said pusher means is driven by a drive which, when actuated, moves said pusher means above and along said support means, said curved ramp and by said side entrance.

12. An apparatus of claim 11, wherein said pusher means has a face portion which contacts the bottom of a stack of containers.

13. An apparatus of claim 12, wherein said pusher means comprises a plate mounted on a transport means which is driven by aid drive, said plate presents said face portion and is of a width to move between said spaced-apart bars as said driven transport means moves said plate by said side entrance.

14. An apparatus of claim 13, wherein said plate has an arcuate surface extending rearwardly of said face portion, said arcuate face ensuring that such stack of containers drop into said lower portion of the chute by preventing containers from catching at said side entrance while dropping into said chute lower portion.

15. An apparatus of claim 14, wherein said drive is controlled to stop movement of said plate with said arcuate surface located inwardly of said spaced-apart bars and positioned at the interior surface of said chute to prevent containers falling out said side entrance.

16. An apparatus of claim 15, wherein said transport means includes a closed chain trained about sprockets which define its path of travel, said chain being adapted to carry said plate along said support means and ramp and between said spaced-apart bars.

17. An apparatus of claim 5, adapted for use with a container filling machine, a device located at the base of said chute to withdraw containers one at a time from such stack, sensor means for detecting when level of containers is at a predetermined level and causing a signal, a drive and control therefor which moves said pusher means, said control on receiving a signal from said sensor means actuating said drive to push another stack of containers on said support means into said chute thereby maintaining a constant supply of containers to be withdrawn from said chute lower portion by said device for subsequent filling.

18. An apparatus of claim 17, wherein said pusher means is located above and is adapted to travel along said support means and follow the upward curvature of the ramp, said pusher means moving out of contact with such stack of containers as it moves by said side entrance to permit such stack of containers to drop.

19. An apparatus of claim 17, wherein said pusher means has a face portion which contacts the bottom of a stack of containers, said drive, as it moves said face portion by said side entrance, disengages said face portion from stack bottom to permit such stack of containers to drop.

20. An apparatus of claim 17, wherein the upper portion of said chute means above said lower portion is defined by a plurality of upwardly extending spaced-apart bars adapted to confine a stack of containers, a pair of spaced-apart bars extend downwardly and outwardly away from said chute to define said side entrance into said chute.

21. An apparatus of claim 20, wherein said pusher means comprises a plate mounted on a transport means which is driven by said drive, said plate, as mounted, presents a face portion for contacting the bottom of a stack of containers on said support means, said plate being of a width to move between said spaced-apart bars as said driven transport moves said plate by said side entrance.

22. An apparatus of claim 21, wherein said plate has an arcuate surface extending rearwardly of said face portion, said arcuate face ensuring that such stack of containers drop into said lower portion of the chute by preventing containers from catching at said side entrance while dropping into said chute lower portion.

23. An apparatus of claim 22, wherein said drive is controlled to stop movement of said plate with said arcuate surface located inwardly of said spaced-apart bars and positioned at the interior surface of said chute to prevent containers falling out of said side entrance.

24. An apparatus of claim 22, wherein said transport means includes a closed chain trained about sprockets which define its path of travel, said chain being adapted to carry said plate along said support means and ramp and between said spaced-apart bars.

25. An apparatus of claim 24, wherein a pair of plates are attached to said closed chain, said pair of plates being spaced from one another on said chain to locate said arcuate surface on one plate at said chute side entrance and locate said face portion of the other plate for pushing a stack of containers on said support means when said drive is stopped.

26. An apparatus of claim 17, wherein said sensor means is a photo cell which detects a light beam as soon as the level of stacked containers is at a predetermined level in said chute means.

27. An apparatus of claim 25, wherein a second sensor means senses location of said face portion for pushing a stack of containers, said second sensor stopping said drive on sensing desired location of said pusher face portion.

28. An apparatus of claim 5, wherein said chute lower portion is a tube of a diameter to receive a stack of containers, means provided at tube bottom to prevent containers of such stack falling freely from said tube, above said tube are four equally spaced-apart mounted rods which define an upward continuation of said tube to constitute said chute upper portion and thereby confine a stack of containers within said rods, an adjacent pair of said rods sloping outwardly and downwardly away from chute interior to define said side entrance above said tube, said sloping pair of rods guiding a pushed stack of containers upwardly into said chute upper portion to permit a portion of such stack of containers to drop into said tube.

29. An apparatus of claim 28, wherein said ramp is smoothly curved leading from said support means upwardly to said chute side entrance, said ramp contacting the upper portion of said tube to lie beneath said pair of outwardly sloped rods which guide a pushed stack of containers into the upper portion of said chute.

30. An apparatus of claim 29, wherein said pusher means is driven by a drive.

31. An apparatus of claim 30, wherein said pusher means has a container contacting portion for pushing such stack of containers and a trailing arcuate surface, a part of said arcuate surface, as it is positioned beneath said sloping bars, deflecting such stack of containers as said container contacting portion of said pusher disengages such stack to direct such stack to drop into said tube.

32. An apparatus of claim 31, wherein said pusher means is a plate member of a width adapted to move between said pair of spaced-apart bars, said plate is quadrant shaped to present, when associated with said drive, said container contacting portion and said trailing arcuate portion.

33. An apparatus of claim 32, wherein said means provided at the bottom of said chute is a device for dispensing one container at a time from such stack.

34. An apparatus of claim 33, adapted to dispense creamer containers onto a conveyor for subsequent filling.

35. An apparatus of claim 1 for loading a plurality of stacks of containers into a corresponding plurality of chutes, wherein said support means supports a plurality of spaced-apart rows of stacked containers on their sides and a plurality of said guide means guide each aligned supported row of stacked containers through respective chute side entrance into corresponding chutes.

36. An apparatus of claim 35, wherein said support means, as it supports a plurality of stacks of containers, is moveable into and out of operative alignment with said guide means.

37. An apparatus of claim 35, wherein said plurality of chutes are upright.

38. An apparatus of claim 37, wherein said support means is essentially level, each of said guide means curving each such stack of containers upwardly as it moves from said support means to within a corresponding chute.

39. An apparatus of claim 38, wherein said pusher means have face portions which contact the respective bottoms of the stacks of containers, a drive moves said face portions of the pusher means by the side entrance of each chute to disengage the face portions from stack bottoms to permit such stacks of containers to drop.

40. An apparatus of claim 39, wherein each chute lower portion is a tube of a diameter to receive a stack of containers, means is provided at tube bottom to prevent containers of such stack falling freely from said tube, mounted above each of said tubes are four equally spaced-apart rods which define an upward continuation of said tube to constitute said chute upper portion and thereby confine a stack of containers within said rods, said tubes being adjacent one another such that a single pair of rods between adjacent tubes serve to define portions of adjacent chutes, an adjacent pair of said rods sloping outwardly and downwardly away from chute interior to define each respective chute side entrance above the respective tube, said sloping pair of rods guiding a pushed stack of containers upwardly into said chute upper portion to permit such stack of containers to drop into said tube.

41. An apparatus of claim 40, wherein each of said guide means is a ramp which is smoothly curved and leads from said support means upwardly to a respective chute side entrance, said ramp contacting the upper portion of each tube to lie beneath the respective pair of outwardly sloped rods which guide a pushed stack of containers into the upper portion of said corresponding chute.

42. An apparatus of claim 41, wherein said pusher means comprises a plurality of plates corresponding in number to the number of chutes, each plate is of a width adapted to pass between corresponding pairs of spaced-apart bars at each chute entrance, each plate being quadrant shaped to present, as attached to a transport driven by said drive, a face portion for contacting the bottom of each container stack and a trailing arcuate portion which deflects such stack of containers as released from engagement with said face portion of the respective plate to direct such stack to drop into said respective tube.

43. An apparatus of claim 42, wherein said transport comprises spaced-apart closed chains mounted on sprockets to define the path of travel of said plates, a member spanning and connected to said closed chains, said plates being mounted on said member, said drive in moving said chains also moving said plates to push supported stacks of containers into respective chutes.

44. An apparatus of claim 43, wherein two sets of plates are provided, each set being mounted on a member spanning and connected to said closed chains, the spacing between said sets about said chains being such that, when one set is positioned at said container entrance with the arcuate surfaces located to deflect stacks of containers into the tubes, the other set is positioned to push supported stacks of containers.

45. An apparatus of claim 42, wherein said support means comprises a conveyor having a plurality of horizontal parallel spaced-apart rods of predetermined spacing to support between pairs of rods a desired number of parallel rows of container stacks, said conveyor being moveable to said operative position which aligns each row of containers with a respective guiding ramp, after removal of the stacks of containers from the support means, the conveyor is moveable to another location away from the guide ramps for loading essentially simultaneously another plurality of stacks of containers onto said support means.

46. An apparatus of claim 45, wherein said conveyor comprises at least two closed chains trained about sprockets and having spaced-apart rods mounted on said chains, said sprockets being located at approximate equal height to define an essentially horizontal bed onto which the stacks of containers may be loaded, said conveyor loaded with a plurality of stacked containers being moveable to align such supported stacks with corresponding guide ramps and subsequently being returned to said other location for loading essentially simultaneously another plurality of stacked containers.

47. An apparatus adapted to support and convey a plurality of rows of stacked containers which have been stacked in a bag, comprising a conveyor having a plurality of evenly spaced-apart parallel rods mounted on a carrier which moves said rods to and away from container stack discharge area, the spacing between adjacent rods being such to support a stack of containers on its side, container retainer means provided along a side of said conveyor and which extends the length of a plurality of rods for receiving a predetermined number of rows of stacked containers in a bag, said container retainer means defining an opening sufficiently large to permit a bag storing stacks of containers to pass therethrough and being less than container width to be placed on said conveyor, the arrangement being such that a bag having a plurality of rows of stacked containers may be placed on said rods with rows of stacked containers placed between said rods, an open end of such bag being remote from said retainer means, said retainer means retaining such rows of containers between said rods as such bag is removed through said opening.

48. An apparatus of claim 47, wherein said carrier comprises spaced-apart closed chains trained over sprockets, drive means for said carrier to move said rods to and stop them at container stack discharge area, resumed movement of said drive means in the same direction returning said members to a location for loading another plurality of rows of stacked containers onto said members.

49. An apparatus of claim 47, wherein a housing is provided for said conveyor, access to the upper surface of said conveyor being provided by a hinged door.

50. An apparatus of claim 49, wherein said door is hinged to said housing, said housing defining a bottom edge of said opening and the free end of said door when closed defines an upper edge of said opening, said bottom edge retaining container stacks on said conveyor while the underside of said door contains stacks of containers against said bottom edge as the bag is withdrawn.

51. An apparatus of claim 49, wherein a plurality of doors provide access to the plurality of rods for receiving two sets of rows of stacked containers.

52. An apparatus of claim 50, wherein said housing, which defines said bottom edge of said retainer means, overlaps a minor portion of a side of said conveyor, removal of a bag through said opening pulling all container stacks against said housing to provide aligned stack edges on said conveyor.

53. An apparatus of claim 47 adapted to convey rows of stacked containers to a plurality of chute means for the stacks, each of said chute means having a container entrance, means for guiding movement of a plurality of stacks of containers through respective chute entrance and up into the chute means, said chute means comprising a lower portion beneath said side entrance for holding a portion of a stack of containers, and an upper portion above said side entrance for holding any remaining portion of a stack of containers, means for pushing stacks of containers along said support means and guide means upwardly into respective said chute means; said pusher means being adapted to release contact with the bottoms of such stacks and permit such stacks to drop into said chute lower portions, drive means for moving said pusher means, first sensor means for detecting when level of containers is at a predetermined lower level in said chute and causing a signal, second sensor means for detecting presence on said conveyor of rows of stacked containers aligned with said guide means for placement in said plurality of chute means, said second sensor causing a signal on detecting absence of stacks of containers, conveyor drive means for said conveyor, a signal from said second sensor actuating said conveyor drive means to move a plurality of supported rows of stacked containers into alignment with said guide means, a signal from said first sensor actuating said pusher drive means to push a plurality of stacks of containers into corresponding chutes and permit them to drop into the respective chute lower portions.

54. An apparatus of claim 53, wherein said conveyor drive means is delayed in moving said conveyor upon receiving an actuating signal caused by said second sensor until said pusher means and pushed stacks of containers are clear of said conveyor.

55. An apparatus of claim 53, wherein said first and second sensors are photoelectric cells used in combination with light sources.

56. An apparatus of claim 53, wherein a pair of pusher means are spaced apart from one another, as mounted on a transport means driven by said drive means, each pusher means presenting face portions for contacting the bottoms of container stacks, a third sensor for detecting presence of a pusher means in position about to contact the bottoms of supported stacks of containers and causing a signal to stop said drive means.

57. An apparatus of claim 56, wherein each pusher means has an arcuate surface extending rearwardly of said face portion, said arcuate face ensuring that each stack of containers drop into respective said lower portion after said face portion has been disengaged from stack bottom.

58. A method for loading a stack of containers into a chute comprising supporting a stack of containers in a row on its side near said chute, said chute having a container side entrance spaced above the bottom of and below the top of said chute means to define upper and lower chute portions, push a row of supported stacked containers towards said container entrance and guiding such movement of the stack through said entrance upwardly into said chute upper portion, releasing engagement with said stack and permitting it to drop in said chute lower portion.

59. A method of claim 58, adapted to load a plurality of rows of stacked containers into a corresponding plurality of chutes and holding said stacks of containers in said chutes and withdrawing from the base of each chute one container at a time, said method comprising supporting on a support a plurality of rows of stacked containers on their sides, said rows being evenly spaced apart, parallel with one another and registered with respective said container side entrances, pushing all of said plurality of rows at once and guiding them through said side entrances upwardly into said chutes and permitting them to drop into respective said chute lower portions.

60. A method of claim 59, comprising moving said supported rows of stacked containers into registration with said chutes and moving said support away to a location for loading another set of rows of stacked containers onto said support.

61. A method of claim 59, comprising supporting several sets of rows of stacked containers on a moveable support, moving a set of rows of stacked containers into registration with respective said container side entrances, sensing when level of stacks of containers is below said container side entrances and pushing an aligned supported set of rows of stacked containers into respective said chutes and moving another supported set of rows of stacked containers into registration with said chutes.

62. A method of claim 61 adapted to load stacks of creamer containers into said chutes for a creamer container filling machine.

* * * * *